(12) United States Patent
Zhang et al.

(10) Patent No.: US 12,416,332 B2
(45) Date of Patent: Sep. 16, 2025

(54) BEARING SEAL AND ITS APPLICATIONS

(71) Applicant: Aktiebolaget SKF, Gothenburg (SE)

(72) Inventors: Meng Zhang, Datong (CN); Dapeng Li, Shenyang (CN); Yangguang Zhao, Xinchang County (CN)

(73) Assignee: Aktiebolaget SKF, Gothenburg (SE)

( * ) Notice: Subject to any disclaimer, the term of this patent is extended or adjusted under 35 U.S.C. 154(b) by 55 days.

(21) Appl. No.: 17/992,719

(22) Filed: Nov. 22, 2022

(65) Prior Publication Data

US 2023/0204073 A1 Jun. 29, 2023

(30) Foreign Application Priority Data

Dec. 23, 2021 (CN) .......................... 202111586786.6

(51) Int. Cl.
 *F16C 33/80* (2006.01)
 *F16C 19/16* (2006.01)
(52) U.S. Cl.
 CPC .............. *F16C 33/80* (2013.01); *F16C 19/16* (2013.01)
(58) Field of Classification Search
 CPC ........ F16C 19/06; F16C 19/16; F16C 33/585; F16C 33/7883; F16C 33/80; F16C 33/805
 See application file for complete search history.

(56) References Cited

U.S. PATENT DOCUMENTS

2004/0080113 A1* 4/2004 Linden ................ F16C 33/7879
                                                    277/412
2021/0115974 A1* 4/2021 Schamin ................ F16C 41/002

FOREIGN PATENT DOCUMENTS

DE   102017114486 A1 * 1/2019 .............. F16C 33/76
JP       H0835525 A  * 2/1996
JP     2003139141 A  * 5/2003 ............. F16C 33/414

OTHER PUBLICATIONS

Machine Translation of JP-H0835525-A (Year: 1996).*
Machine Translation of JP-2003139141-A (Year: 2003).*
Machine Translation of DE-102017114486-A1 (Year: 2019).*

* cited by examiner

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

A bearing seal provides a first sealing member to be secured to a shoulder on one side of a first bearing ring and a second sealing member that can be secured to a shoulder on the same side of a second bearing ring. A labyrinth seal gap is formed between the first sealing member and the second sealing member, which has at least one tooth-shaped turn. On the basis of the above bearing seal, the present invention further provides a rolling bearing that employs the bearing seal on an axial side thereof.

9 Claims, 2 Drawing Sheets

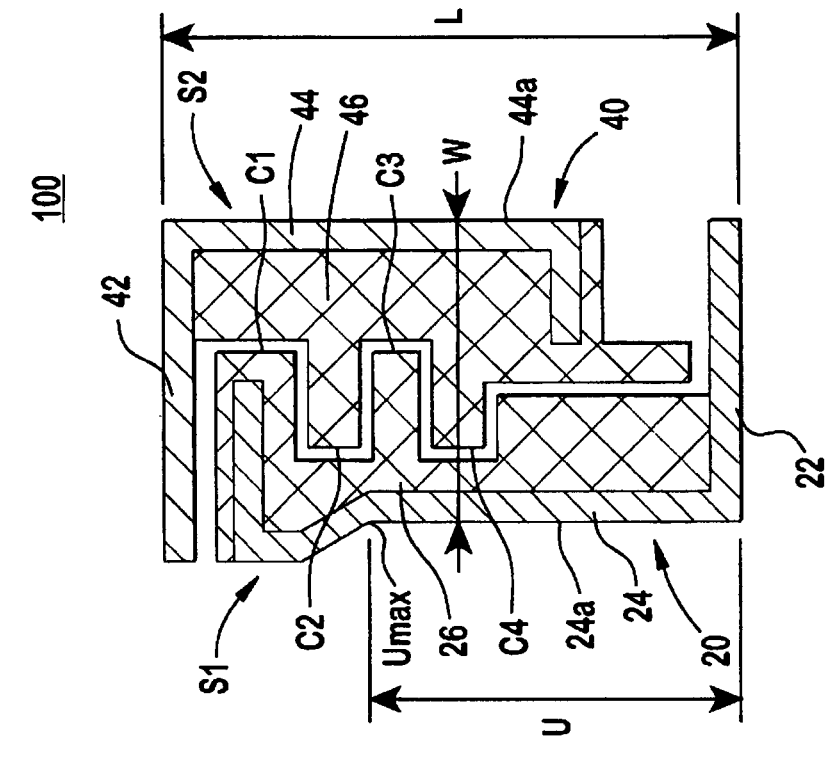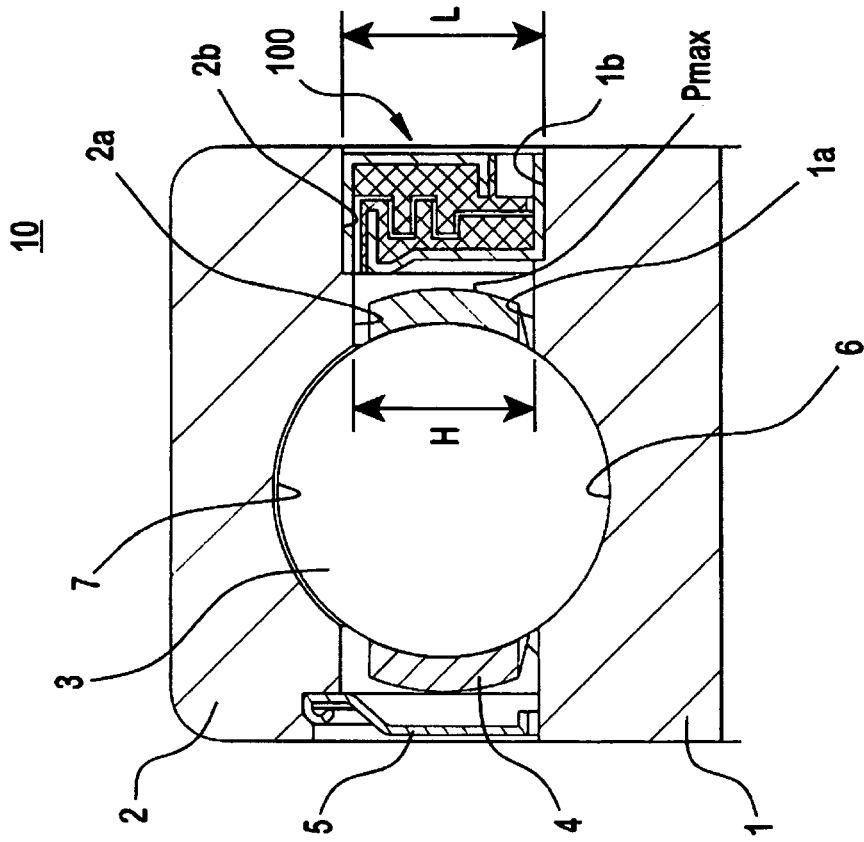
FIG. 1
FIG. 2

BEARING SEAL AND ITS APPLICATIONS

CROSS-REFERENCE TO RELATED APPLICATIONS

This application claims priority to Chinese Patent Application no. 202111586786.6, filed Dec. 23, 2021, the contents of which is fully incorporated herein by reference.

TECHNICAL FIELD

The invention relates to a bearing seal and a roller bearing employing such seal.

BACKGROUND ART

Bearing seals are essential for retaining lubricant, isolating contaminants, and extending the life of bearings. However, due to boundary size limitations, standard bearings of general purpose models are generally only equipped with simple seals with conventional protection capability, making it difficult to use seals with better sealing performance but complex structure. Taking the deep groove ball bearing shown in FIG. 1 as an example, the bearing is provided on the left side thereof with a conventional type of dust shield. Such shield uses a non-contact gap seal, which is difficult to meet the requirements imposed by heavy pollution environment on the seal. In order to meet a higher level of protection requirements, users have to add additional protection measures to the existing dust shield, which not only causes an increase in equipment costs, but also brings a lot of inconvenience for use and maintenance.

The reality calls for a bearing seal that is compact enough to fit in a standard boundary size bearing without losing good sealing performance.

SUMMARY OF THE INVENTION

To solve the above technical problems, the present invention provides a bearing seal comprising a first sealing member that can be secured to a shoulder on one side of a first bearing ring and a second sealing member that can be secured to a shoulder on the same side of a second bearing ring. A labyrinth seal gap is formed between the first sealing member and the second sealing member, which has at least one tooth fold.

The above-mentioned seal, although non-contact, offers significantly better sealing performance than conventional lightly protected seals, and are capable of achieving an equivalent level of protection to good performing but complex contact seals. More importantly, compared to contact seals, non-contact seals based on labyrinth passages can be made compact enough to be easily assembled in standard bearings with limited boundary dimensions. This advantage overcomes the previous technical bottleneck of using only small, lightly protected seals for standard bearings, allowing the seal protection level of standard bearings to be greatly improved so that they can be used directly in heavily contaminated applications.

On the basis of the above-mentioned seal, the present invention also provides a rolling bearing having standard boundary dimensions and which is provided on an axial side thereof with the bearing seal. Here, the standard boundary dimensions, for example, may be the boundary dimensions specified for a standard type of bearing, including but not limited to the dimensions of the bearing's inner diameter, outer diameter, width, etc.

The standard bearings having the above-mentioned seal can achieve improved sealing performance without changing the boundary dimensions thereof, enabling significant expansion of bearing applications without destroying their boundary dimension versatility. Therefore, the standard bearing based on the present invention can be used directly in heavily contaminated environments, fundamentally avoiding the need for additional protective measures by the users and the resulting increased costs.

The various embodiments and beneficial technical effects of the present invention will be described in detail below with reference to the accompanying drawings.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings.

FIG. 1 shows a schematic cross-section of a rolling bearing equipped with a bearing seal according to the present invention on the right side;

FIG. 2 shows an enlarged view of the right side seal in FIG. 1;

DETAILED DESCRIPTION OF EMBODIMENTS

Figure 4:
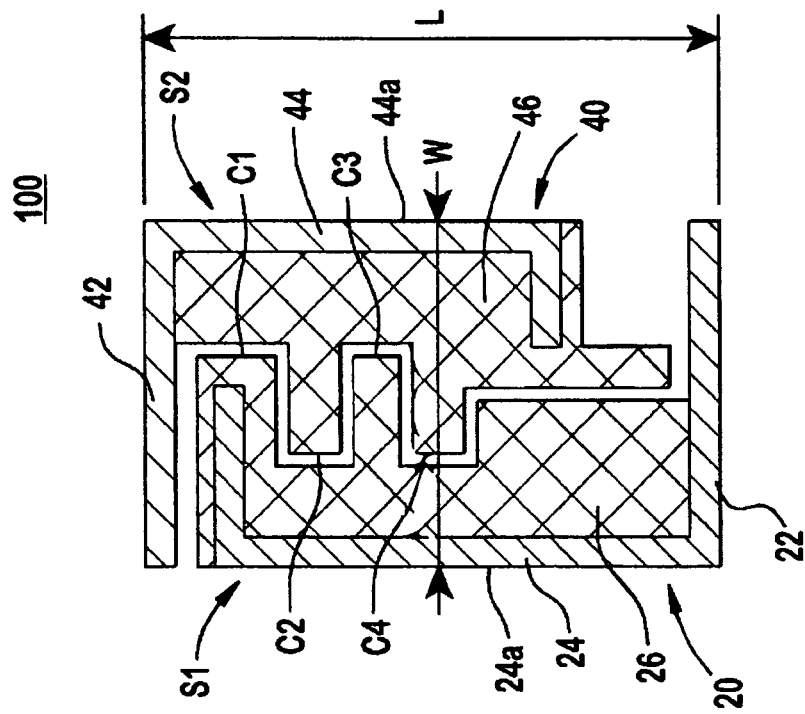
FIG. 4 shows an enlarged view of the right side seal in FIG. 3.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following description, terms indicating directions, such as "axial", "radial" and "circumferential" or "circumferential direction", unless otherwise specified or delimited, refer to the axial, radial and circumferential (direction) of the bearing or the bearing's annular components (such as rings, cages, etc.). Terms indicating spatial positions, such as "inner", "outer", "inside" and "outside", are referenced to the spatial scope defined between the two bearing rings in the Figures.

FIG. 1 shows a schematic cross-sectional view of a rolling bearing equipped with a bearing seal of the present invention on the right side thereof. In the specific embodiment shown in the FIG. 1, the rolling bearing 10 comprises an inner ring 1, an outer ring 2, a plurality of rolling elements 3 provided between the inner ring raceway 6 and the outer ring raceway 7, and a cage 4 that constrains the rolling body 3 to be circumferentially spaced at prescribed intervals. The dust shield 5 provided on the left side of the bearing 10 is a light sealing guard routinely used for standard bearings in the prior art.

FIG. 2 is an enlarged view of the right side seal in FIG. 1. The seal 100 is typically a labyrinthine non-contact seal comprising in general an inner sealing member S1 capable of being reliably secured to an inner ring shoulder 1a and an outer sealing member S2 capable of being reliably secured to an outer ring shoulder 2a. The inner sealing member S1 comprises an inner flinger 20 for support and an inner seal body 26 attached to the inner flinger 20, and the outer sealing member S2 comprises an outer flinger 40 for support and an outer seal body 46 attached to the outer flinger 40. The inner and outer seal bodies 26, 46 may be made of an elastomeric material such as normal rubber, low friction rubber or polytetrafluoroethylene (PTFE). In the particular embodiment shown, the inner flinger 20 includes an axial portion 22 that can be assembled by a tight fit in an inner ring shoulder recess 1b and a radial portion 24 that can radially block lubricant leakage from the inside of the bearing to the outside; the outer flinger 40 includes an axial portion 42 that can be assembled by a tight fit in an outer ring shoulder recess 2b and a radial portion 44 that can block external contaminants from entering the interior of the bearing.

In an assembled state, the inner seal body 26 and the outer seal body 46 fit together to form a labyrinthine non-contact sealing gap (hereinafter referred to as the "labyrinth channel") C. In the particular embodiment shown, the labyrinth channel C includes four tooth-shaped turns (or simply "toothed turns") C1, C2, C3 and C4. Here, the term "toothed turns" refers to a cross-sectional pattern similar to the gear meshing state in which teeth are embedded, either in the U-shaped turns shown in the Figure or in other types of turns not shown in the Figure, for example, V-shaped turns. The number of the toothed turns can be one, two, three or more than four. It is not difficult to understand that the manner of turning and the structural distribution of the labyrinth channel C between the seal bodies should be determined according to the needs of the application and is not limited by the specific embodiment shown.

Although, in theory, the sealing effect of non-contact seal is not as good as contact seal, but as long as the labyrinth channel is long and winding enough and the channel gap is narrow enough, it can still obtain good sealing effect, and can avoid the temperature rise effect and the reduction of transmission efficiency which are associated with contact seal. In addition, labyrinth seals are actually a gap fit, and compared to lip contact seals, gap fit based seals can be constructed to be relatively compact and further compressed in size. As a result, labyrinth seals are easier to fit into bearings, acting as contact seals that were previously difficult to fit into bearings due to their complex construction. This is particularly advantageous where seal dimensions (especially axial dimensions) are limited, as described in further detail below.

In the particular embodiment shown in FIG. 2, the radial portion 24 of the inner flinger 20 has a recessed structure U on a side thereof facing the rolling elements 3/cage 4, so that the seal 100, as a whole, has a partially slim cross-sectional profile, i.e., the seal 100 has an axial dimension (hereinafter referred to as "thickness") W that is smaller than the rest of the seal 100 in the radial direction corresponding to the local extent of the recessed structure U. Within the local extent in the radial direction, the thickness W, as shown in FIG. 2, is defined by the left side surface 24a of the inner flinger radial portion 24 and the right side surface 44a of the outer flinger radial portion 44. In the present invention, the ratio of the thickness W to the spacing H between the bearing inner and outer ring shoulders (herein after referred to as "bearing shoulder spacing" or "shoulder spacing") is defined as the "width-to-height ratio" to describe the proportionality of the narrow part of the seal relative to the bearing shoulder spacing. It is not difficult to understand that with a constant shoulder spacing H, a larger the width-to-height ratio indicates a thicker seal and a smaller the width-to-height ratio indicates a less thick seal.

As a preferred embodiment, the location of the deepest part Umax of the recess U may correspond in the radial direction to the axial protrusion Pmax of the rolling elements 3 and/or the cage 4. On the one hand, the deepest part Umax of the recess U tends to form a groove structure in favor of the retention of lubricant and thus improves lubrication at the protrusion where friction is most intense. On the other hand, the deepest part Umax of the recess U also creates a safety distance compatible with the protrusion Pmax, thus allowing a greater displacement, deformation and/or vibration amplitude of the protrusion Pmax. The above features help to expand the adaptability of the seal to different types of rolling elements and/or cages.

Figure 3:
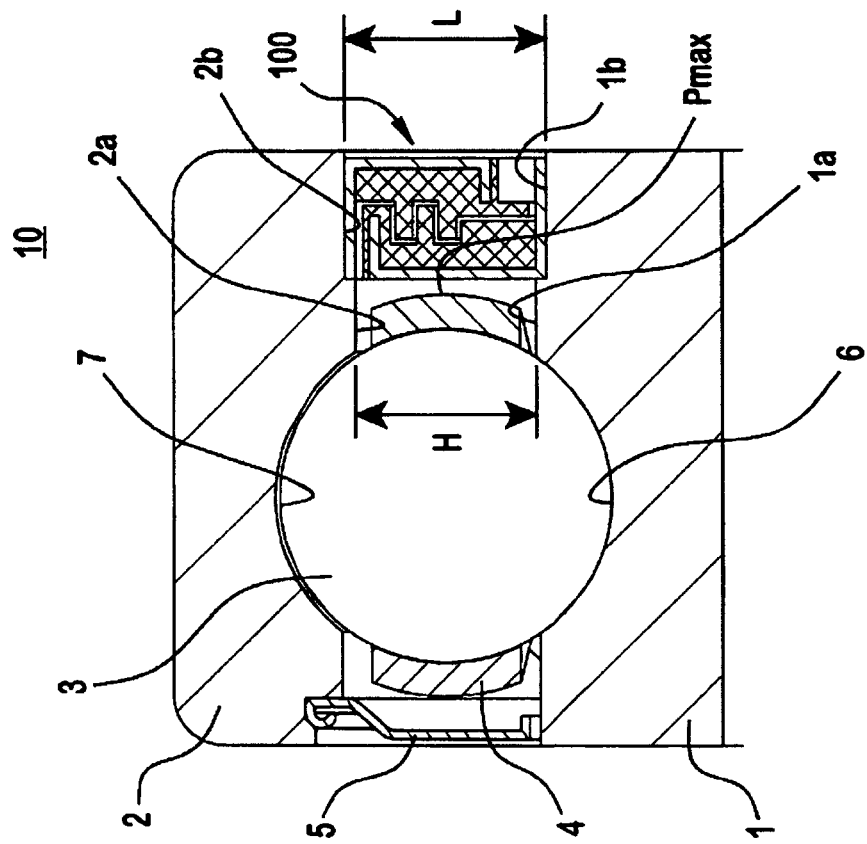
FIG. 3 shows a schematic cross-section of a rolling bearing equipped with a bearing seal according to the present invention on the right side.

In contrast to the cross-sectional morphology of the partially slim structure shown in FIG. 2, FIGS. 3 and 4 show that the seal 100 has the thickness distribution of an overall slim structure. In the particular embodiment shown in FIGS. 3 and 4, the inner flinger 20 has a substantially L-shaped cross-sectional shape, the radial portion 24 of which has a flat structure extending throughout the radial direction such that the thickness W of the seal 100 remains substantially uniform throughout the radial direction. Compared to the partially slim structure shown in FIG. 2, this overall slim structure clearly facilitates the yielding of more axial space, thus allowing the bearing to gain more internal space.

Regardless of the form of the slim structure, the width-to-height ratio W/H of seal 100 as defined above should not exceed 0.50. In a preferred embodiment, the width-to-height ratio W/H does not exceed 0.40. In a further preferred embodiment, the width-to-height ratio W/H does not exceed 0.35. In a still further preferred embodiment, the width-to-height ratio W/H does not exceed 0.25. In addition, the percentage of the entire radial size L (hereinafter referred to as the "slim percentage") of the seal 100 that meets the above width-to-height ratio conditions is at least 50%. In a preferred case, the slim percentage is at least above 75%. In a further preferred case, the slim percentage is at least above 80%. In an extreme case, the slim percentage can reach 100%, thus forming the overall slim structure shown in FIGS. 3 and 4, as described in further detail later.

The slim structure described above has several benefits. First, allowing a seal of complex structure to be used in a standard bearing with limited boundary dimensions (especially axial boundary dimensions), thus giving the standard bearing a good sealing performance that was previously difficult to achieve. Secondly, the axial space thus released can be given over to the internal use of the bearing, for example, to increase the diameter of the rolling elements, thereby increasing the bearing's load carrying capacity, or to accommodate more lubricant, thereby improving bearing lubrication.

In the particular embodiment shown in FIG. 1, the inner and outer ring raceways 6, 7 are offset to one side (left side in the Figure) of the bearing and thus away from the seal 100 on the other side (right side in the Figure) of the bearing. This solution balances the spacing distance between the rolling elements and/or cage and the seals on either side by rearranging the distribution of the internal space of the bearing, so that the rolling elements and/or cage is centrally located in the internal space of the bearing in the axial direction. In the particular embodiment shown in FIG. 1, the left side of the bearing may have a light protective seal, for example, a dust shield 5, and the right side of the bearing may have a heavy protective seal, for example, the improved slim seal 100 of the present invention. This asymmetrical seal layout can be perfectly adapted to bearing applications with light contamination on one side and heavy contamination on the other.

It should be understood by those of skill in the art that the bearing seals and their applications mentioned above are not limited by the specific embodiments and that the more general technical solutions will be subject to the limitations of the accompanying claims. Any changes and modifications to the present invention are within the scope of protection of the present invention, provided they conform to the limitations of the accompanying claims.

The invention claimed is:

1. A bearing seal comprising:
   a first sealing member configured to be secured to a first shoulder recess on a first axial side of a first bearing ring, the first sealing member comprising a first flinger and a first seal body formed on the first flinger, and
   a second sealing member configured to be secured to a second shoulder recess on the first axial side of a second bearing ring, the second sealing member comprises a second flinger and a second seal body formed on the second flinger, wherein
   a labyrinth seal gap is formed between the first sealing member and the second sealing member, wherein
   the first flinger comprises a first axial portion which is secured into the first shoulder recess, the first axial portion having none of the first seal body formed thereon, wherein
   the second flinger comprises a second axial portion which is secured into the second shoulder recess, the second axial portion having none of the second seal body positioned between the second axial portion and the second shoulder recess, and wherein
   the first and second axial portions of the first and second flingers form a portion of the labyrinth seal gap.

2. The bearing seal according to claim 1, wherein the labyrinth seal gap is partially formed between the first seal body and the second seal body.

3. The bearing seal according to claim 1, wherein the first sealing member is configured such that a ratio of W/L falls within a range of W/L≤0.50, wherein W is the axial distance between the first flinger and the second flinger as measured at a midpoint along a radial height of the bearing seal and L is a radial distance between a first radially outer surface of the first axial portion of the first flinger and a second radially inner surface of the second axial portion of second flinger.

4. The bearing seal according to claim 3, wherein the ratio W/L is less than or equal to 0.40.

5. The bearing seal according to claim 4, wherein the ratio W/L is less than or equal to 0.35.

6. The bearing seal according to claim 5, wherein the ratio W/L is less than or equal to 0.25.

7. A rolling bearing comprising a first bearing ring, a second bearing ring, and a bearing seal, the bearing sealing being located on a first axial side of the rolling bearing, the bearing seal comprising:
   a first sealing member configured to be secured to a first shoulder recess on the first bearing ring on the first axial side of the rolling bearing, the first sealing member comprising a first flinger and a first seal body formed on the first flinger, and
   a second sealing member configured to be secured to a second shoulder recess on the second bearing ring on the first axial side of the rolling bearing, the second sealing member comprises a second flinger and a second seal body formed on the second flinger, wherein
   a labyrinth seal gap is formed between the first sealing member and the second sealing member, wherein
   the first flinger comprises a first axial portion which is secured into the first shoulder recess, the first axial portion having none of the first seal body formed thereon, wherein
   the second flinger comprises a second axial portion which is secured into the second shoulder recess, the second axial portion having none of the second seal body positioned between the second axial portion and the second shoulder recess, and wherein
   the first and second axial portions of the first and second flingers form a portion of the labyrinth seal gap.

8. The rolling bearing according to claim 7, wherein the bearing has, on the first axial side thereof where the seal is arranged, inner and outer ring shoulders that are radially closer together than the shoulders on the other axial side of the bearing.

9. The rolling bearing according to claim 8, wherein bearing ring raceways are axially closer to a second axial side of the bearing, the second axial side being opposite the first axial side.

* * * * *